(12) United States Patent
Fujita et al.

(10) Patent No.: US 6,373,020 B1
(45) Date of Patent: Apr. 16, 2002

(54) WELDING APPARATUS

(75) Inventors: Shigeo Fujita; Tadashi Nakamura; Taiichiro Morishita, all of Shiga (JP)

(73) Assignee: Takao Kinzoku Kogyo Co., Ltd., Shiga (JP)

(*) Notice: Subject to any disclaimer, the term of this patent is extended or adjusted under 35 U.S.C. 154(b) by 0 days.

(21) Appl. No.: 09/374,996

(22) Filed: Aug. 16, 1999

(30) Foreign Application Priority Data

May 26, 1999 (JP) .............................................. 11-145797

(51) Int. Cl.[7] .............................................. B23K 11/10
(52) U.S. Cl. ......................................... 219/87; 219/86.9
(58) Field of Search ................................... 219/86.9, 87

(56) References Cited

U.S. PATENT DOCUMENTS

| | | | | |
|---|---|---|---|---|
| 2,057,794 A | * | 10/1936 | Sorensen et al. | |
| 2,097,377 A | * | 10/1937 | Martin | |
| 2,975,264 A | * | 3/1961 | Fetz | |
| 3,927,295 A | * | 12/1975 | Schuster et al. | |
| 4,091,254 A | * | 5/1978 | Struve | |
| 4,439,664 A | * | 3/1984 | Toohey | |
| 4,439,665 A | * | 3/1984 | Arter | |
| 4,529,858 A | * | 7/1985 | Scherr et al. | |
| 5,121,873 A | * | 6/1992 | Sekiya et al. | |
| 5,340,960 A | * | 8/1994 | Takasaki et al. | |
| 5,484,975 A | * | 1/1996 | Itatsu | |
| 5,582,747 A | * | 12/1996 | Sakai et al. | |
| 5,789,719 A | * | 8/1998 | Pary et al. | |

FOREIGN PATENT DOCUMENTS

| | | | |
|---|---|---|---|
| JP | 61-135488 | * | 6/1986 |
| JP | 09-099377 | * | 4/1997 |

* cited by examiner

Primary Examiner—Blaine Copenheaver
Assistant Examiner—Leanna Roché
(74) Attorney, Agent, or Firm—Armstrong, Westerman & Hattori, LLP

(57) ABSTRACT

A welding apparatus provided with lower electrode portions, upper electrode portions, and a cooling water circulation duct which circulates and supplies cooling water to welding electrode pressurizing cylinder guns on the upper electrode portions. A check valve is disposed on an upstream side to the cylinder guns in the cooling water circulation duct. Further, a booster is disposed on a downstream side to the cylinder guns in the cooling water circulation duct, and the cylinder guns are extended for welding by pressurizing the cooling water in the duct from the booster to the check valve through the cylinder guns.

8 Claims, 8 Drawing Sheets

WELDING APPARATUS

BACKGROUND OF THE INVENTION

1. Field of the Invention

This invention relates to a welding apparatus.

2. Description of the Related Art

Conventionally, as shown in FIG. 7 and FIG. 8, a welding apparatus, provided with an electrode die portion c having a lower base portion a and an upper base portion b elevatable as to close to and part from the lower base portion a, plural lower electrode portions d arranged on the lower base portion a, plural upper electrode portions e arranged on the upper base portion b, and an elevation driving mechanism which ascends and descends the upper base portion b, is known.

To explain in further detail, the upper electrode portion e has welding electrode pressurizing cylinder guns g supplied with cooling water circulation in unpressurized state and pressed to contact a welded object f placed on the lower electrode portions d in pressurized state, and each of the cylinder guns g is connected to a cooling water circulation supplying duct h. And, a booster i is disposed on an upstream side to the cylinder guns g in the duct h, and a stop valve j is disposed on a downstream side to the cylinder guns g in the duct h. In FIG. 7 and FIG. 8, plural cylinder guns g form a group, and one booster i and one stop valve j are provided as to correspond to the group. That is to say, this welding apparatus is provided with plural boosters i and stop valves j respectively corresponding to the groups of the cylinder guns g.

FIG. 8A shows unpressurized state of the cylinder gun g. Both of the booster i and the stop valve i are in open state, and cooling water is circulated and supplied to the cylinder gun g through the duct h. In welding, as shown in FIG. 8B, the stop valve i is closed by supplying compressed air with switching an electromagnetic valve k, the booster i is worked to become closed state by supplying compressed air with switching an electromagnetic valve m, and the cylinder guns g of one group are extended by pressurizing the cooling water in the duct h from the booster i to the stop valve i through the cylinder gun g to contact and weld the welded object f placed on the lower electrode portions d. And, in FIG. 8B, biased portion represents the pressurized cooling water.

However, there are problems that each of the boosters i and the stop valves j, used once or twice in one cycle of production, require large installation space for their utilization rate, and, the electromagnetic valves k and m, corresponding to each of the boosters i and the stop valves j, cause high cost.

And recently, for example, for changes in crash safety standards of automobiles, number of pressed parts and welding spots have been inclining to extremely increase along with increasing rigidity of automobile body, upper and lower electrode portions in one welding apparatus have been increasing thereby, and increase of number of parts such as a booster and structural complication of the apparatus have been generated. Further, there is a problem directly relating to weldability that pressure control of many (eighteen, for example) boosters can not be set individually in one cycle of production in conventional gun pressurizing control, and a welding element, namely, pressurizing control is forced to be constant.

And, concerning the elevation driving mechanism which ascends and descends the upper electrode portions, many parts cause much cost for that a crank elevation driving mechanism is used as the elevation driving mechanism, and it has bad influence on operating rate of production that die height (the height of the die) is manually set and the die is changed semi-automatically.

To solve the problems above, it is therefore an object of the present invention to provide a welding apparatus with which constructural simplification and reduction of production cost can be achieved, and multi-point welding can be conducted with high accuracy.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
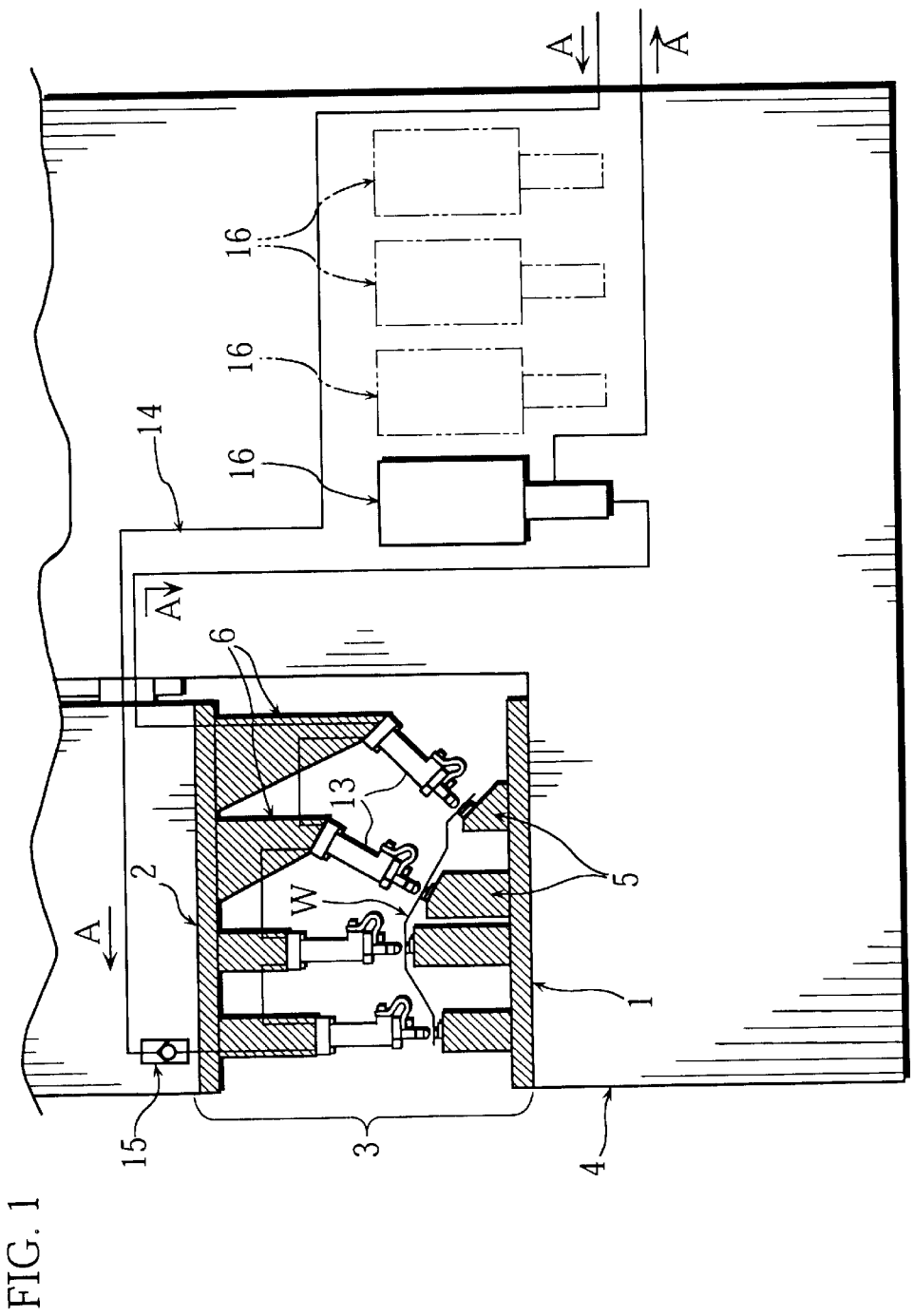
FIG. 1 is a schematic explanatory view of construction showing a preferred embodiment of a welding apparatus of the present invention.
Figure 2:
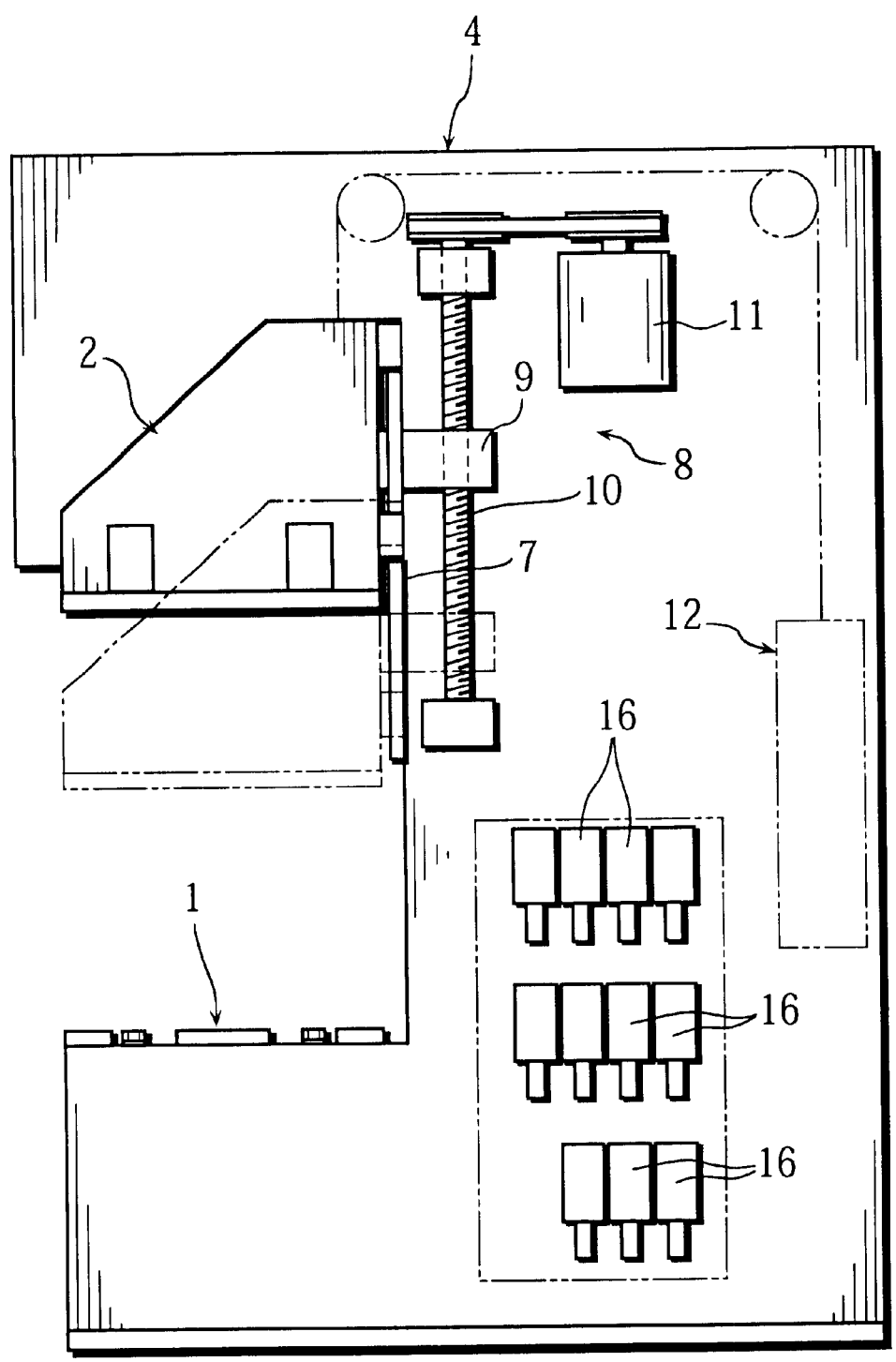
FIG. 2 is a schematic explanatory view of construction showing an elevation driving mechanism.

FIG. 1 and FIG. 2 show a preferred embodiment of a welding apparatus of the present invention. This welding apparatus is provided with an electrode die portion 3 having a lower base portion 1 and an upper base portion 2 at least one of which is driven to elevate as the upper and lower base portions freely close to and part from each other, and the electrode die portion 3 is detachably attached to a base frame 4. And, plural lower electrode portions 5 are arranged on the lower base portion 1, and plural upper electrode portions 6 are arranged on the upper base portion 2.

To describe concretely, the upper base portion 2 is arranged on the base frame 4 as to be elevatable, and the upper electrode portions 6 are driven to elevate along with the upper base portion 2 by an elevation driving mechanism 8. The elevation driving mechanism 8 is provided with a vertical guiding rod 7 attached to the base frame 4 for guiding the upper base portion 2 as to freely slide vertically, a nut portion 9 arranged on the upper base portion 2, a screw shaft 10 which is vertically arranged in the base frame 4 as to freely rotate and screws into the nut portion 9, and a motor 11 which drives the screw shaft 10 to rotate. Torque from the motor 11 is transmitted to the screw shaft 10 through a rotation force transmission member such as a belt, a pulley, etc. And, 12 represents a balance weight for reducing the load of the motor 11. The above balance weight 12 may be omitted by increasing the power of the motor 11.

And, in this welding apparatus, the upper electrode portion 6 is having a welding electrode pressurizing cylinder gun 13 which is supplied with cooling water in unpressurized state and pressed to contact a welded object W placed on the lower electrode portion 5 in pressurized state, and provided with a cooling water circulation duct 14 which circulates and supplies cooling water to each cylinder gun 13 of each upper electrode portion 6. The cooling water, sent from a cooling water supplying device not shown in Figures, circulates in an arrow A direction in the duct 14.

Further, as shown in FIG. 1 and FIG. 3, in the welding apparatus of the present invention, a check valve 15 is disposed on an upstream side to the cylinder gun 13 in the cooling water circulation duct 14, and a booster 16 is disposed on a downstream side to the cylinder gun 13 in the cooling water circulation duct 14. In this case, one cylinder gun 13 or plural cylinder guns 13 of predetermined number compose a group, and one check valve 15 and one booster 16 correspond to the group of cylinder guns 13. That is to say, this welding apparatus is provided with plural check valves 15 and plural boosters 16 respectively corresponding to plural groups of the cylinder guns 13. And, 17 represents an electromagnetic valve which switches supplying direction of compressed air supplied to the booster 16. As described above, the cylinder gun 13 is defined as that one or plural cylinder guns 13 compose a group in the present invention.

Figure 3B:
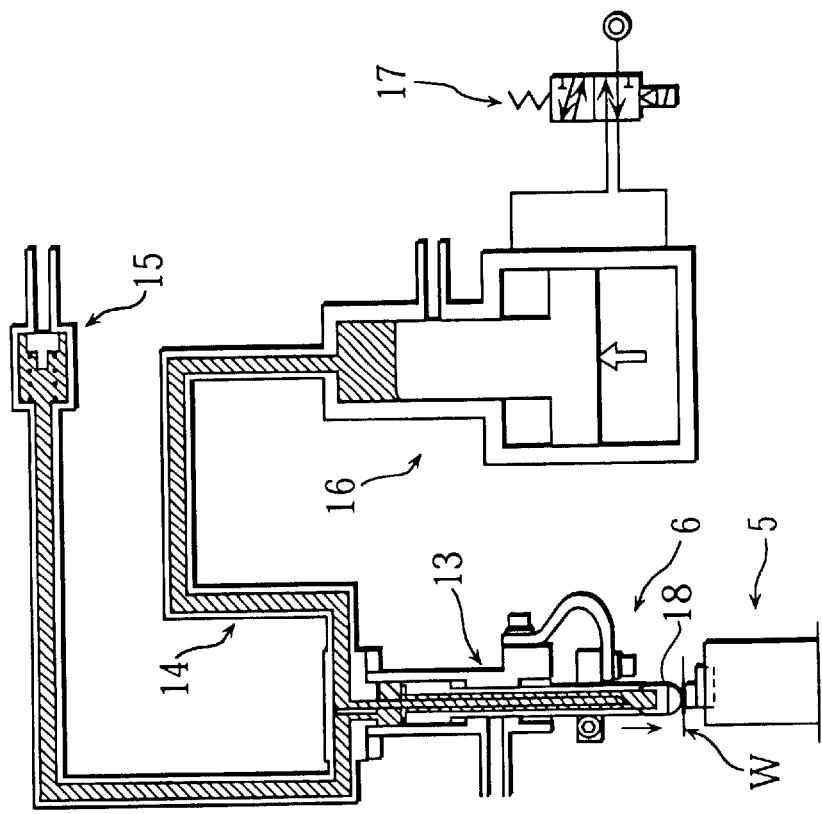
FIG. 3B is a working explanatory view showing pressurized state of the welding electrode pressurizing cylinder gun.
Figure 3A:
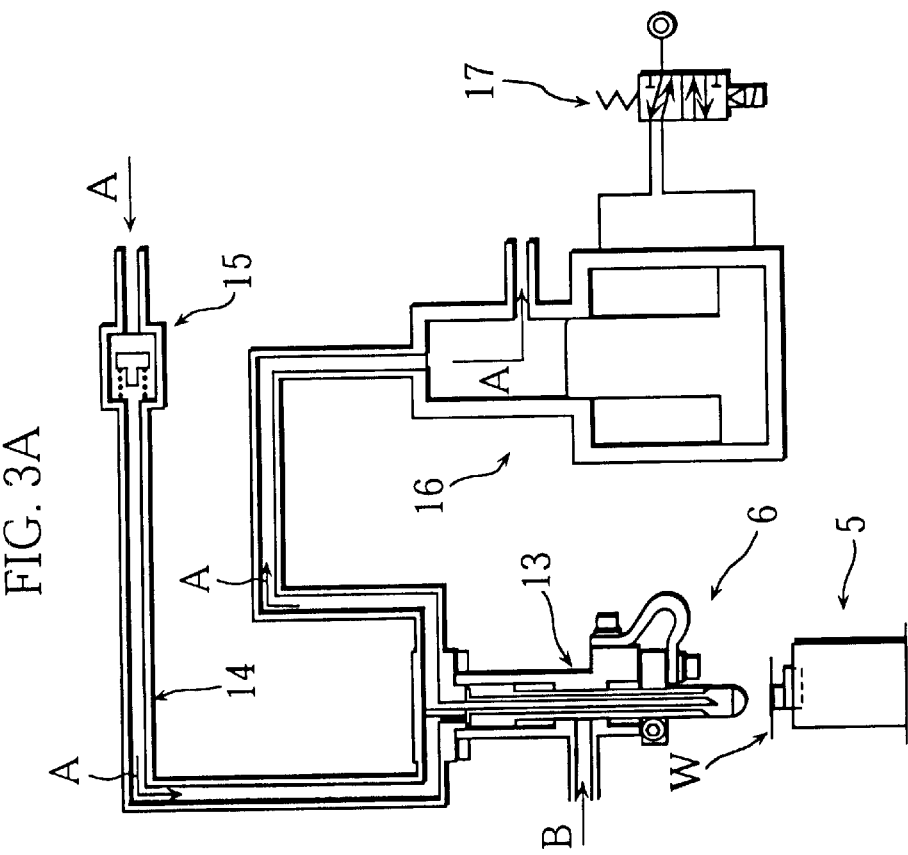
FIG. 3A is a working explanatory view showing unpressurized state of a welding electrode pressurizing cylinder gun.

FIG. 3A shows unpressurized state (non-welding state) of the cylinder gun 13. In this case, cooling water which runs through the cooling water circulation duct 14 is circulated as to pass the check valve 15, the cylinder gun 13, and the booster 16 serially. In welding, the upper base portion 2 is descended to a position of predetermined height by the elevation driving mechanism 8 described with reference to FIG. 2, the cooling water in the duct 14, running from the booster 16 to the check valve 15 through the cylinder gun 13, is pressurized by working of the booster 16 to become closed state with switching the electromagnetic valve 17 as shown in FIG. 3B, the check valve 15 is closed and the cylinder gun 13 is extended (with water pressure) thereby, and a tip electrode portion 18 of the cylinder gun 13 is pressed to the welded object W placed on the lower electrode portion 5 to weld. Biased portion shows the cooling water in pressurized state. In this case, four cylinder guns 13 of a group simultaneously extend and weld (refer to FIG. 1).

And, after the welding, as shown in FIG. 3A, the check valve is opened by working of the booster 16 to become open state with switching the electromagnetic valve 17 again, the cooling water is circulated again, the cylinder gun 13 supplied with compressed air (see an arrow B) becomes contracted state and parts from the lower electrode portion 5.

As described above, also in case of the other groups of the cylinder guns not shown in FIGS. 3A and 3B, each group of the cylinder guns extends and contracts to weld by working of each booster 16, corresponding to each group of the cylinder guns, to open and close.

Figure 4:
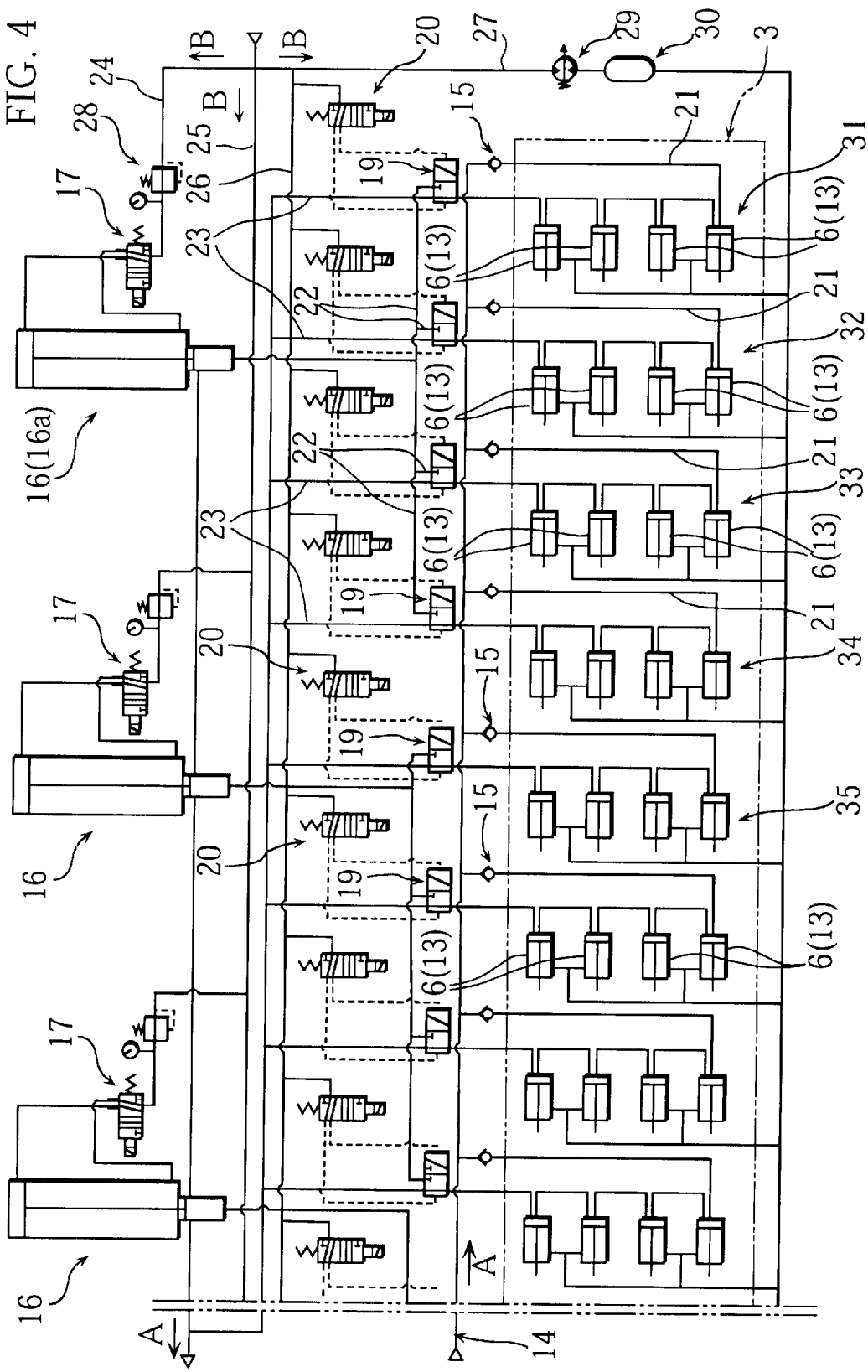
FIG. 4 is a schematic explanatory view of construction showing another preferred embodiment of the welding apparatus.
Figure 5:
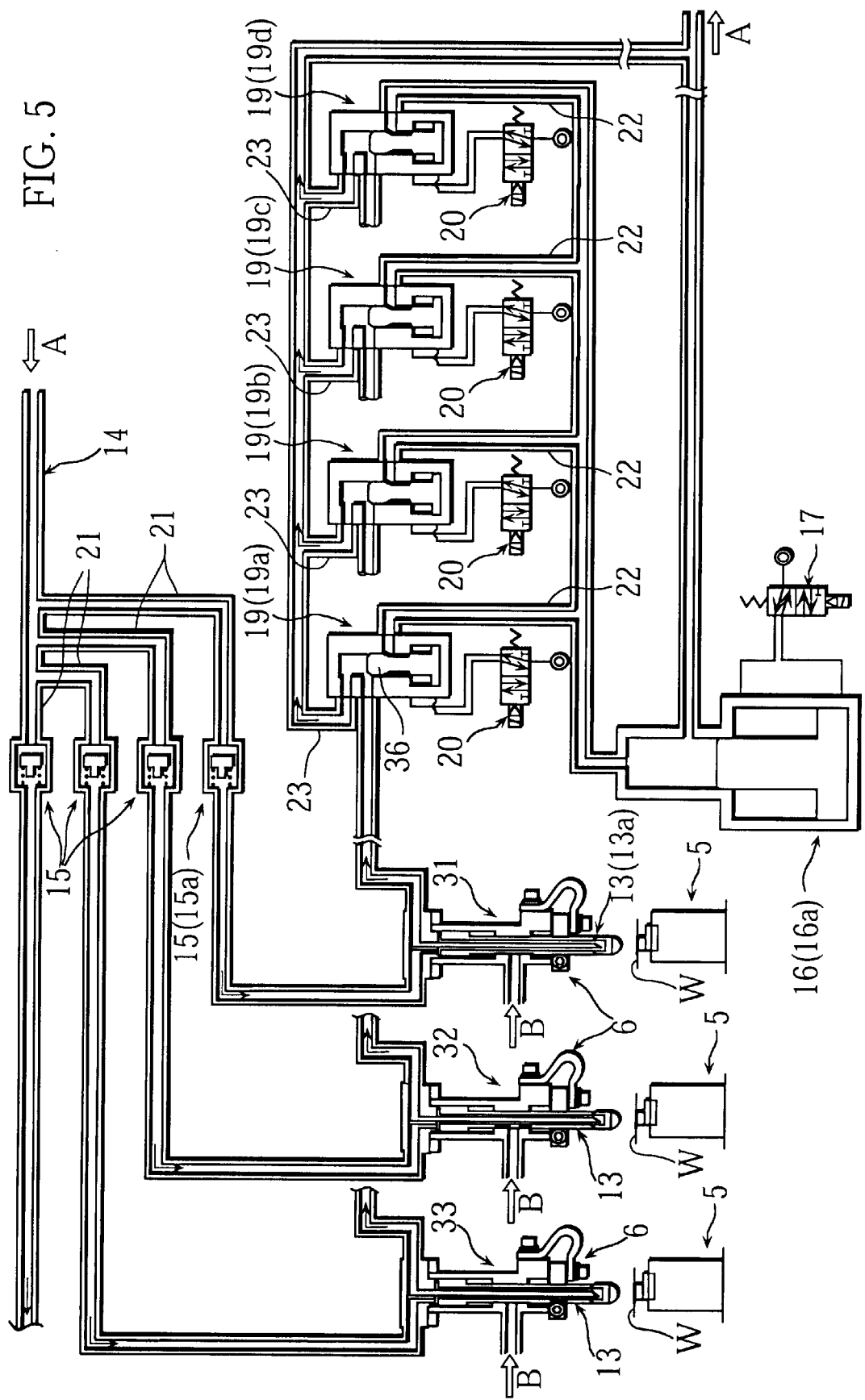
FIG. 5 is an explanatory view showing unpressurized state of the welding electrode pressurizing cylinder gun.

And, as shown in FIG. 4 and FIG. 5, in case that the welding apparatus of the present invention has many upper electrode portions 6 (72 portions, for example), one booster 16, corresponding to predetermined plural groups of one or plural upper electrode portions 6, is disposed on a downstream side to the cylinder gun 13 in the cooling water circulation duct 14, one check valve 15 corresponding to a cylinder gun 13 of each group is disposed on an upstream side to the cylinder gun 13 in the duct 14, and a branch valve 19, switchable from connected to the booster 16 to avoiding the booster 16 side, is disposed between the cylinder gun 13 and the booster 16 as to correspond to the cylinder gun 13 of each group.

To concretely describe this preferred embodiment in FIG. 4, plural groups of four upper electrode portions 6 (cylinder guns 13) such as a first group 31, a second group 32, a third group 33, a fourth group 34, a fifth group 35, etc. are arranged. And, one booster 16 is disposed as to correspond to four groups of the cylinder guns 13, and one check valve 15 and one branch valve 19 are disposed as to correspond to one group of the cylinder guns 13. That is to say, in FIG. 4, one booster 16a corresponds to four groups, namely the first group 31 through the fourth group 34.

And, the cooling water circulation duct 14, connected to the cooling water supplying device not shown in Figures, branches into plural first branch ducts 21 on an upstream portion, and the cooling water runs through each of the first branch ducts 21, each of the check valves 15, each group of the cylinder guns 13, and each of the branch valves 19 (refer to FIG. 5). And, the cylinder guns 13 in one group are each communicatively connected with the first branch duct 21.

And, as shown in FIG. 4 and FIG. 5, on a downstream side of the branch valve 19, a second branch duct 22 is disposed for connection to the booster 16 side, and a third branch duct 23 is disposed for avoiding the booster 16. In this case, four second branch ducts 22, corresponding to four branch valves 19, become confluent into one duct which reaches the cooling water supplying device (not shown in Figures) through one booster 16, and, four third branch ducts 23, corresponding to four branch valves 19, become confluent into one duct which reaches the cooling water supplying device (not shown in Figures). That is to say, the cooling water circulation duct 14 is composed of the first branch ducts 21, the second branch ducts 22, the third branch ducts 23, etc.

And, air pipes 24, 25, 26, and 27 are provided as shown in FIG. 4, the compressed air, supplied by a compressor not shown in Figures, is sent to each of the boosters 16, each of the branch valves 19, and each of the cylinder guns 13 through the air pipes 24, 25, 26, and 27. And, 28 represents an electropneumatic regulator, 29 represents a booster valve for contracting guns, and 30 represents a tank.

FIG. 4 and FIG. 5 show unpressurized state (non-welding state) of the cylinder guns 13 of each group, and each of the branch valves 19 is switched to close each of the second branch ducts 22. Therefore, the cooling water flowing in the cooling water circulating duct 14 is returned to the cooling water supplying device passing through each of the check valves 15, each of the cylinder guns 13, and each of the branch valves 19.

Figure 6:
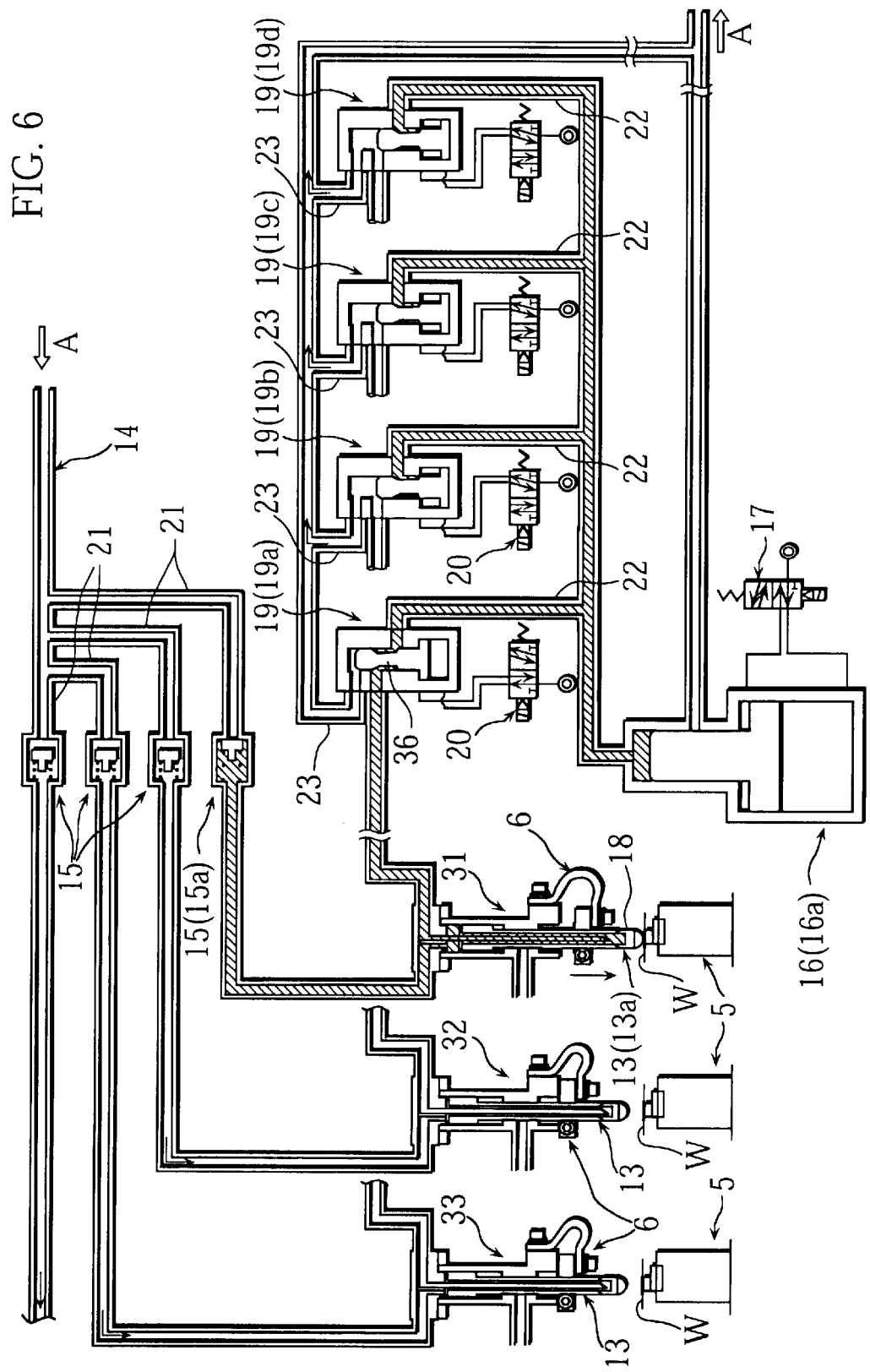
FIG. 6 is an explanatory view showing pressurized state of the welding electrode pressurizing cylinder gun.
Figure 7:
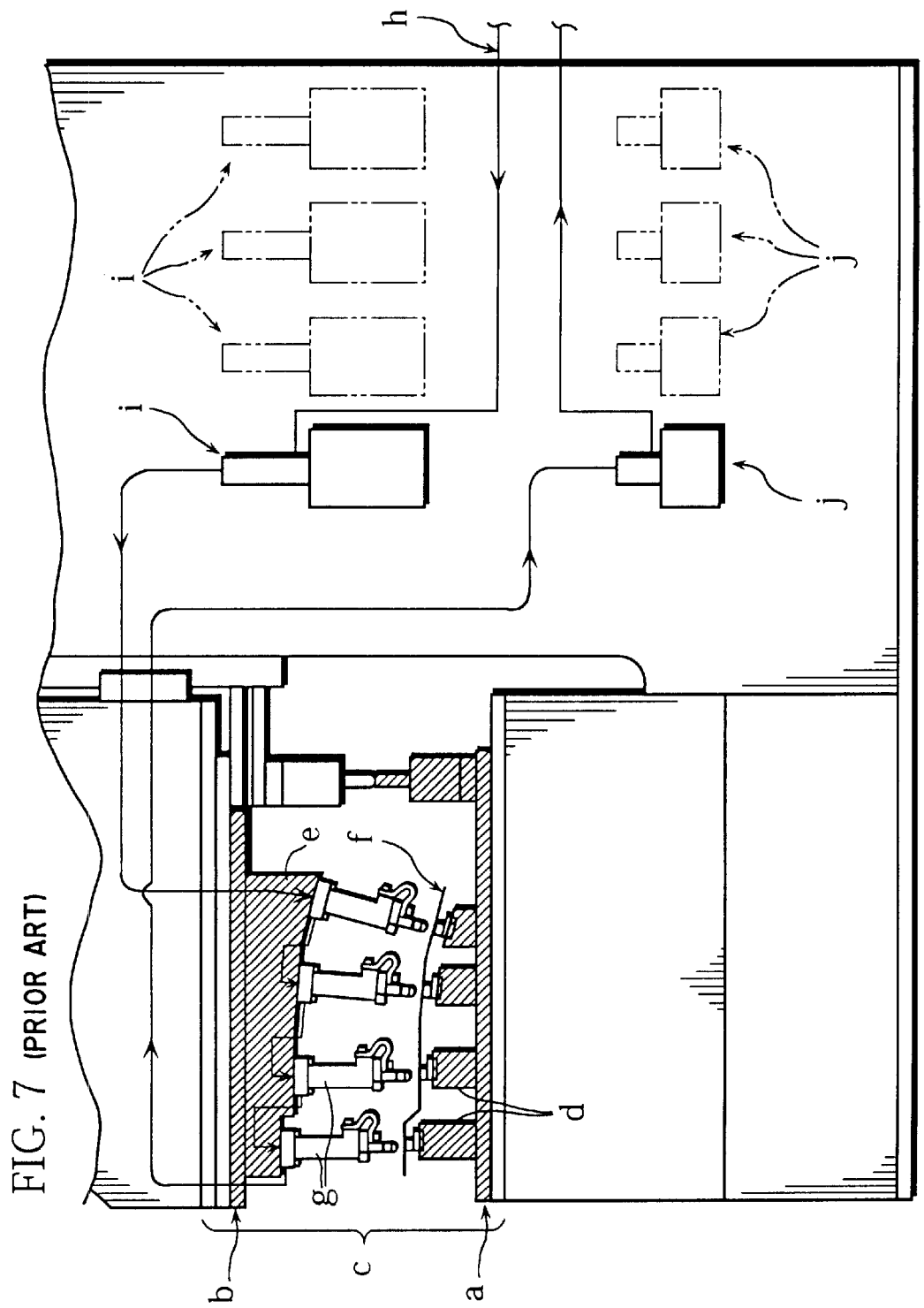
FIG. 7 is a schematic explanatory view of construction showing a conventional example.
Figure 8A:
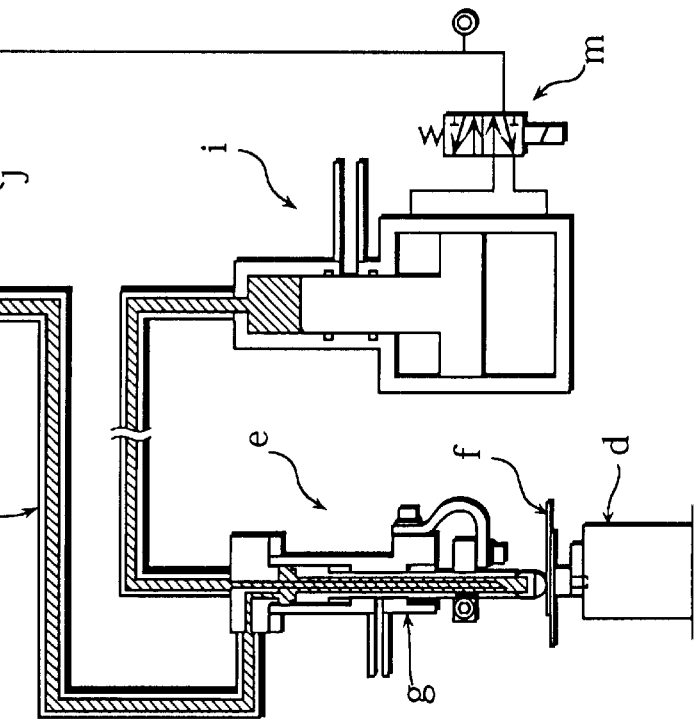
FIG. 8A is a working explanatory view showing unpressurized state of a welding electrode pressurizing cylinder gun in the conventional example.
Figure 8B:
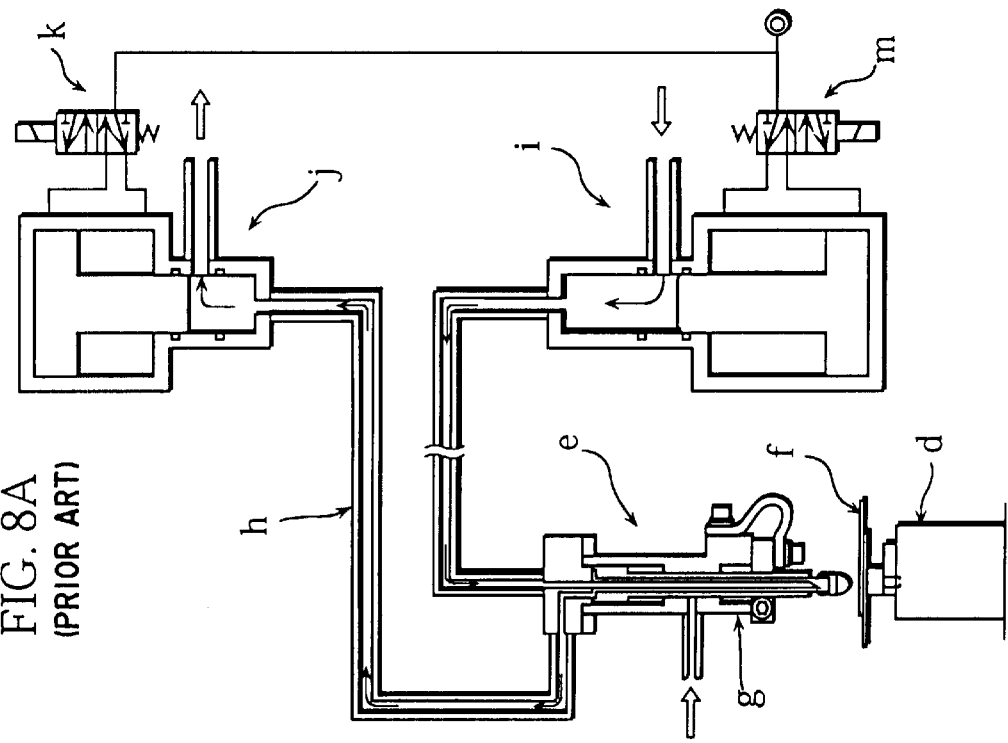
FIG. 8B is a working explanatory view showing pressurized state of the welding electrode pressurizing cylinder gun in the conventional example.

In case that welding is conducted with the upper electrode portions 6 of the first group 31, for example, as shown in FIG. 6, firstly, the booster 16 (16a) is connected to the second branch duct 22 by switching the branch valve 19 (19a) corresponding to the first group 31. A piston valve portion 36 is moved by sending compressed air with switching the electromagnetic valve 20 corresponding to the branch valve 19a to close the branch duct 23 and open the branch duct 22. Then, the cooling water in the duct 14, from the booster 16a to the check valve 15a through the branch valve 19a and the cylinder gun 13a, is pressurized by working of the booster 16a, the check valve 15a is closed and the cylinder gun 13a is extended thereby, and a tip electrode portion 18 of the cylinder gun 13a is pressed to the welded object W placed on the lower electrode portion 5 to weld (refer to FIG. 4). Biased portion shows the cooling water in pressurized state. In this case, the cylinder guns 13 of other groups in unpressurized state (non-welding state), namely the second group 32, the third group 33, the fourth group 34, etc., are supplied with the cooling water circulated continuously.

And, after the welding, as shown in FIG. 5, the check valve 15a is opened and the cooling water is circulated again by opening the booster 16a and switching the branch valve 19a, and the cylinder gun 13a supplied with compressed air (shown with an arrow B) returns to contracted state.

Next, in case that welding is conducted with the upper electrode portions 6 of the second group 32, similar to the above description, four cylinder guns 13 of the second group 32 are extended by pressurizing the cooling water with switching a branch valve 19b corresponding to the second group 32 and working of the booster 16a. As described above, the third group 33 and the fourth group 34 of the cylinder guns 13 of the upper electrode portions 6 can be serially extended to weld. And, in case that welding is conducted by the upper electrode portions 6 of groups after the fifth group 35, the booster 16 and the branch valve 19 corresponding to each group are chosen and worked.

In the present invention, not restricted to the embodiments described above, for example, order of welding, which does not necessarily start with the first group 31, can be freely set by controlling the electromagnetic valve 17 corresponding to the booster 16 and the electromagnetic valve 20 corresponding to the branch valve 19 of each group. And, the welding can be conducted with plural groups simultaneously, for example, the upper electrode portions 6 of the first group 31 and the upper electrode portions 6 of the fourth group 34 are simultaneously worked to weld. And, electrode pressurizing control of each welding point is possible by the booster 16, and the welding can be conducted with high accuracy.

Although a case that one booster 16 corresponds to four groups of the upper electrode portions 6 is shown in the present embodiment, one booster 16 may be corresponding to one to three groups or more than five groups of the upper electrode portions 6. And, number of the upper electrode portions 6 for one group is freely determined. And, in case that number of groups corresponding to one booster 16 is small, for example, a case that one booster 16 corresponds to only one group of the upper electrode portions 6, the branch valve 19 may be omitted.

According to the welding apparatus of the present invention, simplification of construction and reduction of production cost can be obtained because conventionally necessary stop valves and electric circuit can be omitted. And, parts change and maintenance of the apparatus become easy, and change of the installation site becomes easy for use of the small check valves 15. And, it is possible to attach the apparatus directly to a die attachment port, which is not taught by the prior art, length of piping of the cooling water circulation duct 14 can be shortened, and delay of pressurizing the cylinder gun caused by inflation of high-pressure hose of piping in pressurization is lessened and follow-up ability is improved thereby.

And, according to the welding apparatus of the present invention, in a welding apparatus having many upper electrode portions 6, number of the boosters 16 can be greatly reduced, for example, from conventional 18 units to 4 units, by corresponding one branch valve 19 and one check valve 15 to one group of the upper electrode portions 6, piping becomes easy and production cost can be reduced by reduction of assembly man hour and space. And, pressurization control for each welding point becomes possible for adopting the electropneumatic regulator for pressure control of the booster 16, multi-point welding with high accuracy and stable quality can be conducted thereby. That is to say, electrode pressurizing force control, welding element for stabilizing welding quality, can be established.

Although pressure sensors which detect water pressure in the cylinder guns must be disposed to each duct of many boosters conventionally, number of the pressure sensors can be greatly reduced accompanying the reduction of the number of the boosters 16 in the present invention.

Further, according to the welding apparatus of the present invention, construction of the elevation driving mechanism 8 becomes simple, and number of parts and production cost of the driving system can be reduced. And, material cost for the electrode die portion is reduced because change of die height (height of the die) is possible and the die height can be set low. Further, change of the die can be automatic and production operating rate is improved.

While preferred embodiments of the present invention have been described in this specification, it is to be understood that the invention is illustrative and not restrictive, because various changes are possible within the spirit and indispensable features.

What is claimed is:

1. A welding apparatus provided with an electrode die portion having a lower base portion and an upper base portion at least one of which is driven to ascend and descend to freely close to and part from the other base portion, with a lower electrode portion attached to the lower base portion and an upper electrode portion attached to the upper base portion having a welding electrode pressurizing cylinder gun which is supplied with cooling water in an unpressurized state and which is pressed to a welded object placed on the lower electrode portion to weld in a pressurized state, and having a cooling water circulation duct which circulates and supplies cooling water to the cylinder gun, comprising a construction in which:

a check valve is disposed on an upstream side directly communicating with the cylinder gun in the cooling water circulation duct;

a booster is disposed on a downstream side directly communicating with the cylinder gun in the cooling water circulation duct; and wherein the check valve is closed and the cylinder gun is extended and pressed to the welding object to weld by pressurizing the cooling water in the cooling water circulation duct directly from the booster and directly to the check valve through the cylinder gun with the booster.

2. A welding apparatus as defined in claim 1 including an elevation driving mechanism which ascends and descends the upper base portion, the elevation driving mechanism having a nut portion arranged on the upper base portion connected to a balance weight, a screw shaft which screws into the nut portion, and a motor which drives the screw shaft to rotate.

3. A welding apparatus provided with an electrode die portion having a lower base portion and an upper base portion at least one of which is driven to ascend and descend to freely close to and part from the other base portion, with plural lower electrode portions attached to the lower base portion and plural upper electrode portions attached to the upper base portion having plural groups of welding electrode pressurizing cylinder guns which are supplied with cooling water in an unpressurized state and which are pressed to a welded object placed on the lower electrode portions to weld in a pressurized state, and having a cooling water circulation duct which circulates and supplies cooling water to the plural groups of cylinder guns, comprising a construction in which:

a booster, corresponding to predetermined plural groups of one upper electrode portion or to predetermined plural groups of said plural upper electrode portions, is disposed on a downstream side and directly communicating with the plural groups of cylinder guns in the cooling water circulation duct;

a check valve corresponding to one group of the plural groups of cylinder guns is disposed on an upstream side and directly communicating with the cylinder guns in the cooling water circulation duct;

a branch valve, switchable from being connected to the booster to avoid the booster, is disposed between the plural groups of cylinder guns and the booster in the cooling water circulation duct as to correspond to each group of the cylinder guns; and the cylinder guns of predetermined groups are extended and pressed to the welded object to weld by switching the branch valve and pressurizing the cooling water with the booster.

4. A welding apparatus as defined in claim 3 including an elevation driving mechanism which ascends and descends the upper base portion, the elevation driving mechanism having a nut portion arranged on the upper base portion, a screw shaft which screws into the nut portion, and a motor which drives the screw shaft to rotate.

5. A welding apparatus provided with an electrode die portion having a lower base portion and an upper base portion at least one of which is driven to ascend and descend to freely close to and part from the other base portion, with a lower electrode portion attached to the lower base portion and an upper electrode portion attached to the upper base portion having a welding electrode pressurizing cylinder gun which is supplied with cooling water in an unpressurized state and which is pressed to a welded object placed on the lower electrode portion to weld in a pressurized state, and having a cooling water circulation duct which circulates and supplies cooling water to the cylinder gun, comprising a construction in which:

a check valve is disposed on an upstream side to the cylinder gun in the cooling water circulation duct;

a booster is disposed on a downstream side to the cylinder gun in the cooling water circulation duct;

the check valve is closed and the cylinder gun is extended and pressed to the welding object to weld by pressurizing the cooling water in the cooling water circulation duct from the booster to the check valve through the cylinder gun with the booster; and wherein the cooling water is circulated so as to go through the booster when the booster is not pressurized.

6. A welding apparatus as defined in claim 5 including an elevation driving mechanism which ascends and descends the upper base portion, the elevation driving mechanism having a nut portion arranged on the upper base portion, a screw shaft which screws into the nut portion, and a motor which drives the screw shaft to rotate.

7. A welding apparatus provided with an electrode die portion having a lower base portion and an upper base portion at least one of which is driven to ascend and descend to freely close to and part from the other base portion, with plural lower electrode portions attached to the lower base portion and plural upper electrode portions attached to the upper base portion having plural groups of welding electrode pressurizing cylinder guns which are supplied with cooling water in an unpressurized state and which are pressed to a welded object placed on the lower electrode portions to weld in a pressurized state, and having a cooling water circulation duct which circulates and supplies cooling water to the plural groups of cylinder guns, comprising a construction in which:

a booster, corresponding to predetermined plural groups of one upper electrode portion or to predetermined plural groups of said plural upper electrode portions, is disposed on a downstream side to the plural groups of cylinder guns in the cooling water circulation duct;

a check valve corresponding to one group of the plural groups of cylinder guns is disposed on an upstream side to the cylinder guns in the cooling water circulation duct;

a branch valve, switchable from being connected to the booster to avoid the booster, is disposed between the plural groups of cylinder guns and the booster in the cooling water circulation duct so as to correspond to each group of the cylinder guns;

the cylinder guns of predetermined groups are extended and pressed to the welded object to weld by switching the branch valve and pressurizing the cooling water with the booster; and wherein the branch valve connects the cooling water circulation duct with the booster as the cooling water goes through the booster when the booster is not pressurized.

8. A welding apparatus as defined in claim 7 including an elevation driving mechanism which ascends and descends the upper base portion, the elevation driving mechanism having a nut portion arranged on the upper base portion, a screw shaft which screws into the nut portion, and a motor which drives the screw shaft to rotate.

* * * * *